United States Patent [19]

Crocker et al.

[11] 4,407,987

[45] Oct. 4, 1983

[54] POLYMERIC RESINS AND BLENDS WITH HIGH PACKING DENSITIES

[75] Inventors: Zenas Crocker, Westmount; David V. Wise, St. Bruno, both of Canada

[73] Assignee: Synergistics Chemicals Limited, Quebec, Canada

[21] Appl. No.: 315,370

[22] Filed: Oct. 27, 1981

[51] Int. Cl.$^3$ ................................................ C08J 3/02
[52] U.S. Cl. .................................... 523/322; 524/425; 524/451; 524/567; 524/569; 524/430; 524/492; 524/527; 524/497
[58] Field of Search ..................... 260/42.49; 524/425, 524/451, 567, 569, 430, 492, 527, 497; 523/322

[56] References Cited

U.S. PATENT DOCUMENTS

| | | | |
|---|---|---|---|
| 3,229,002 | 1/1966 | Feder | 264/15 |
| 3,263,980 | 8/1966 | Feder et al. | 432/222 |
| 3,472,491 | 10/1969 | Feder | 366/77 |
| 3,957,723 | 5/1976 | Lawson et al. | 260/42.49 |
| 4,046,728 | 9/1977 | Harmuth | 260/42.49 |
| 4,049,593 | 9/1977 | Sato et al. | 260/42.49 |
| 4,230,615 | 10/1980 | Crocker et al. | 260/34.2 |

FOREIGN PATENT DOCUMENTS 813775 5/1969 Canada.

*Primary Examiner*—Melvyn I. Marquis
*Attorney, Agent, or Firm*—Larson and Taylor

[57] ABSTRACT

A powder blend of rigid polyvinyl chloride resin having higher packing densities than previously known is disclosed. The higher packing densities provide improved physical properties and production rates. There is also disclosed a process for the manufacture of a powder blend of suitable thermoplastic polymer resins having high packing densities for processing into articles. The process includes mixing and thermokinetically heating a batch of powder blend in a high intensity mixer having a plurality of blades attached to arms rotating about an axis with a blade tip speed of at least about 25 meters/second to a predetermined temperature below commencement of agglomeration, and cooling the batch in a high intensity mixer having a plurality of blades attached to arms rotating about an axis with a blade tip speed less than about 16 meters/second but sufficient to attain high packing densities, to a temperature at which the batch can be stored without agglomeration occuring.

10 Claims, No Drawings

POLYMERIC RESINS AND BLENDS WITH HIGH PACKING DENSITIES

The present invention relates to polymeric resins and blends. More specifically, the invention relates to dry blending suitable rigid polyvinyl chloride (PVC) compounds or polyethylene resins in powder form with or without additives to produce rigid PVC blends or polyethylene resins and/or blends or compositions having increased packing densities.

Rigid plastic products such as pipe, siding and other shapes may be made from polyvinyl chloride by first dry blending PVC resins and additives in powder form and then feeding the blended powders into an extruder or other processing device to fully flux the material for forming into the end product. Other products can be made from polyethylene resins, such as linear low-density polyethylene (LLDPE), generally in powder form with or without additives. The blending of the resins with any required additives is generally performed by mechanical stirring devices, such as a high intensity mixer, which provides sufficient intensive mixing to raise the temperature of the mix well above the softening point of the resins. The mix is then cooled under agitation and a powder ready for the extrusion process is obtained. The temperature of the mix, however, should not be raised to a point where agglomeration commences.

The agitation in the blending step is sufficiently thorough to ensure dispersion even in small quantities of the additives with resin powders. The maximum temperature of the mix during the blending step is sufficient to ensure melting and absorption of certain ingredients by the resin. The temperature is not raised high enough to create fusing and agglomeration that sometimes occur under mixing conditions at higher temperatures. The hot powder mix is discharged into a cooling vessel whose impeller speed is sufficient to prevent agglomeration and whose cooling surface to volume relationship has been maximized. The powder must be cooled to a sufficiently low temperature to avoid subsequent caking in storage silos or packaged units.

The conversion of the dry blended powder into a final product is generally achieved in an extruder. One of the more important characteristics of such machines is the relatively positive material pumping action from the feed section through the shaping die. In effect, the machine out-put rate is, other conditions being equal, controlled by the rate of material fed to it. Since the extrusion screw geometry presents a particular volume per unit time to the incoming material, the rate in mass-/unit time for a given screw speed is dependent upon the density of the material in mass/unit volume.

The density of a powder can be expressed in two different ways, the bulk density and the packing density. The packing density is measured by pouring a known weight of the powder into a graduated measuring cylinder and tapping in a defined manner to a steady state. After tapping the volume of the material is read and the packing density calculated from the formula:

$$\text{packing density} = \frac{\text{sample weight in grams}}{\text{volume in cubic centimeters}}$$

It is possible by varying polymerization conditions to make various particle shapes and change the average porosity of a PVC resin, since each particle is made up of a porous agglomeration of much smaller primary particles. Then during a blending sequence, additives can diffuse into and partially fill the spaces between the primary particles. Furthermore, the rough edges of the particles tend to be rounded off by friction one against the next. Both these effects tend to raise the packing density of the powder. Other additives can have different particle sizes and specific gravity than PVC resins, and can interspace between the resin particles thereby affecting the packing density of the resin powder mix. As well as affecting packing density, it is found that the particle size distribution of the powder is changed.

In the past it has been found that there are practical limits to which such methods have been able to raise the packing density of dry blends. A typical PVC siding material powder blend with a high titanium dioxide content exhibits, after conventional dry blending, a packing density of about 0.65 gm/cc using suspension PVC resin. Packing density for LLPDE granular resins are typically about 0.44 gm/cc.

It has also been shown that packing densities in dry blends affect the output rate from a twin screw extruder and certain types of single screw extruders. Higher packing density blends produce higher extrusion rates. If the packing density can be increased in the order of 6-7% then the production rate of the extruder could be increased by about the same percentage.

We have found that packing densities in polymeric resins and blends can be increased in a two step process. The first step is a mixing and heating step and occurs in a high intensity mixer wherein blade tip speeds are in excess of about 25 meters per second. The second step is a cooling step which also occurs in a high intensity mixer at blade tip speeds below about 16 meters per second.

We have also found that the packing density of a powder blend of rigid polyvinyl chloride resin with stabilizer and lubricant additives can be increased by about 15 to 35% over the base packing density of the standard or base blends. Throughout the specification and claims reference is made to "base" packing density. This term refers to the packing density in polymeric resins and blends when made by conventional known methods.

The present invention provides a powder blend of rigid polyvinyl chloride resin with stabilizer and lubricant additives and property modifying additives having a packing density for each individual blend being about 15 to 35% higher than a base packing density in the range of 0.55 to 0.75 gms/cc and suitable for processing into articles.

In other embodiments the addition of about 1 to 10% by weight of a filler gives a packing density in the range of about 0.69 to 0.84 gms/cc. The addition of about 10 to 15% by weight of a filler gives a packing density in the range of about 0.75 to 0.88 gms/cc. In other embodiments the addition of up to about 20% by weight of a filler gives a packing density up to about 0.91 gms/cc. Fillers include calcium carbonate, talc, alumina, silicates and others. The addition of about 1 to 10% by weight of a polymeric modifier gives a packing density of about 0.65 to 0.77 gms/cc. The addition of about 10 to 15% by weight of a polymeric modifier gives a packing density in the range of about 0.61 to 0.80 gms/cc. In other embodiments the addition of up to about 40% by weight of a polymeric modifier gives a packing density as low as about 0.5 gms/cc. Modifiers may include property, impact and heat distortion modifiers. The addition of about 1 to 10% by weight of titanium dioxide gives a packing density in the range of about 0.68 to 0.87 gms/cc and the addition of about 10 to 15% by weight of titanium dioxide gives a packing density of about 0.74 to 0.93 gms/cc. In other embodiments the addition of up to about 20% by weight of titanium dioxide gives a packing density up to about 1.0 gms/cc. The powder blend preferably has a packing density in the range of about 0.74 to 0.95 gms/cc.

The present invention also provides in a process for the manufacture of a powder blend of suitable thermoplastic polymer resins having high packing densities for processing into articles, the improvement comprising the steps of, mixing and thermokinetically heating a batch of the powder blend in a high intensity mixer having a plurality of blades attached to arms rotating about an axis with a blade tip speed of at least about 25 meters per second to a predetermined temperature below commencement of agglomeration, and cooling the batch in a high intensity mixer having a plurality of blades attached to arms rotating about an axis with a blade tip speed less than about 16 meters per second, but sufficient to attain high packing densities, to a temperature at which the batch can be stored without agglomeration occurring.

In one embodiment the mixing and heating step and cooling step both occur in the same high intensity mixer. In another embodiment the steps occur in different mixers. In other embodiments of the invention the mixing step takes less than about 20 seconds and the cooling step takes less than about 40 seconds. The blade tip speed is preferably in the range of about 25 to 45 meters per second for the mixing and heating step.

It has been found that the process of this invention works with rigid PVC compositions and polyethylene granular resins with or without additions. Certain flexible PVC compositions do not show much increase in packing density when processed by the method of this invention. Furthermore, polypropylene resin powders do not show any significant increase in packing density when processed according to the present invention.

In the case of powder blends of suitable thermo-plastic polymeric resins, additives may be added such as for example processing aids, lubricants, stabilizers, antioxidants, impact modifiers, fillers, and pigments either in liquid, flake or powder form. In some cases, particularly when additives are included, a preblending step may take place before producing the high packing density blend. The purpose of the preblending step is only to disperse the ingredients evenly throughout the mix in order to feed batches with the proper ingredient proportions.

Batches of the mix with or without additives or preblending are then successively charged to a high intensity mixer with tip speeds above about 25 meters/second. The Gelimat (T.M.) made by Draiswerke GmbH is one example of a high intensity mixer satisfactory for operating the present process. In a preferred embodiment, the Gelimat high intensity mixer is fitted with a system for monitoring the temperature of the batch in the mixer separately from the temperature of the mixer walls and blades, and then discharging the batch from the mixer when the batch temperature reaches a predetermined level. Such a system is disclosed in U.S. Pat. No. 4,230,615. The energy from the high speed rotating blades in the mixer body thermokinetically heats the material at a rate dependent upon the size of the batch, the body temperature of the mixer, the formulation of the material and the tip speed and configuration of the rotating blades. It has been found that tip speeds above about 25 meters/second are advantageous and tip speeds as high as 45 meters/second may be used. The mixing and heating step is controlled so that the batch is discharged or the mixer is slowed down when the batch reaches the desired temperatures. The temperature of the batch controls the mixing and heating cycle. The conditions in the high intensity mixer are chosen to achieve high mixing rates with total heating times of less than 20 seconds. With such a high intensity mixer, high production rates are possible with modestly sized equipment due to the rapid cycles of the mixing step.

After the mixing and heating step when the temperature of the batch is still high, it is necessary to cool the mix immediately, otherwise agglomerization occurs and the material cannot satisfactorily be stored. Therefore, the mix from the high intensity mixer can be discharged into a second high intensity mixer having a water jacket surrounding the body of the mixer. The mixer may be of the same design as that used for the mixing and heating step, but rotating at a tip speed having about 16 meters/second or less to provide a cooling step. The tip speed should not drop too far below this figure, otherwise the high packing densities are not attained. The cooling medium is preferably water which is circulated through the cooling jacket. The length of time for the cooling step is sufficient for the batch to be cooled to a temperature where the product may be stored without agglomeration occurring. As in the case of the mixing and heating cycle, the rate of cooling is a function of the temperature of the batch, cooling capacity available, mixer size, batch size and tip speed. When the batch cools to a predetermined temperature, less than about 60° C. for a rigid PVC resin, the batch is automatically discharged and may be stored in this condition until it is needed to be processed into finished articles. The time delay between the mixing and heating step and cooling step is preferably about a second or less, although longer time periods may occur.

In another embodiment a single high intensity mixer is used for the mixing step and cooling step. The mixer has a cooling jacket and water may be circulated through the cooling jacket at all times, even during the mixing and heating step. Alternatively, water may be circulated through the cooling jacket during the cooling step only. Once the mixing and heating step is completed, the tip speed of the mixer blades is immediately reduced to around 16 meters/second, or just below, and water circulated through the cooling jacket.

Packing densities of powders mixed by this process are generally increased. In the case of a power blend of rigid polyvinyl chloride resin with stabilizer and lubricant additives, packing densities in the range of about 15 to 35% are achieved over powder blends obtained by conventional processes.

EXAMPLE 1

In order to determine the increased packing density of rigid polyvinyl chloride resin and different additives, samples were prepared for a basic formulation, plus a low level and high level of additive according to the following as shown in Table I.

TABLE I

| Composition | Base (gms) | Low Level (gms) | High Level (gms) |
|---|---|---|---|
| PVC Resin in Powder form (Esso 366) | 3800 | 3600 | 3300 |
| Stabilizer: Methyl tin ("Advastab TM-692 Carstab Corp.) | 38 | 36 | 33 |
| Lubricants Calcium Stearate | 38 | 36 | 33 |
| High melting hydrocarbon wax (1262, International Waxes Ltd.) | 38 | 36 | 33 |
| Polyethylene (629 A, Allied Chemical) | 7.6 | 7.2 | 6.6 |
| Processing aid Acrylic polymer powder ("Acryloid K-120 N, Rohm & Haas) | 38 | 36 | 33 |
| Additive | — | 216 | 495 |
| Total Weight | 3959.6 | 3967.2 | 3933.6 |
| % of additive by weight | — | 5.4% | 12.6% |

Three different types of additives were tested for both low and high levels. The additives were a calcium carbonate filler, (Omylite 95T Plüss-Staufer AG), an ABS thermoplastic resin impact modifier, (Blendex 311, Borg Warner) and a pigment, titanium dioxide, (Titanox 2101, Canadian Titanium Pigments Ltd.)

In order to determine the packing density of these samples when processed by conventional methods, a first series of tests were run on a Welex Papenmeier mixer having a blade tip speed of 20 meters per second. The batches were heated to 120° C. and 140° C. before being discharged. For the lower temperature, the time in the mixer was in the range of 12 to 15 minutes and for the higher temperature the time was approximately 18 minutes. The resin was added first and the additives added as the temperature of the batch slowly increased. The packing densities of the samples are shown in Table II Tests were then carried out on the same compositions using a GELIMAT high intensity mixer. The batches were all preblended in a ribbon blender and then charged into the Gelimat mixer which was fitted with a control system for monitoring the batch temperature in the mixer separately from the mixer temperature. The mixer had a blade tip speed of about 32 meters/second. The batches were mixed and heated in the mixer to temperatures of 140° C. and 160° C. For the first temperature the mixing time was about 25 seconds and a few seconds longer for the second temperature. In one series of tests the batch was then cooled in a ribbon blender and in another series of tests the batch was cooled in a second Gelimat mixer which was water cooled. The second Gelimat had a blade tip speed of about 16 meters/second and the batch remained in the mixer for a time ranging from about 40 to 100 seconds before being discharged at a temperature below 60° C.

The packing density of each sample was determined and is shown in Table II. The increase in packing density over the product made by the conventional process is shown as a percentage in the Table. For the Ribbon mix cool samples the increase is in the range of 2 to 10%, for the Gelimat cool the range was 7 to 17% when the batch was heated to 140° C. and 15 to 35% when heated to 160° C.

EXAMPLE 2

One hundred and fifty pounds of a rigid PVC powder compound, containing 12% $TiO_2$ and 5.5% polymeric modifiers, was preblended in a Ribbon blender and batches were then charged into a Gelimat high intensity mixer having a cooling jacket surrounding it. Initially, water was not circulating through the jacket. The mixer was fitted with a control system to monitor the batch temperature separately from the mixer temperature, and was arranged to stop the mixing and heating step when the batch temperature reached a predetermined level. In the mixing and heating step the mixer had a blade tip speed of about 31 meters/second. The batch size was 375 grams and it was found that the time to reach 120° C. in the mixing step varied from 13 to 20 seconds. As soon as the mixing step was completed, cooling water was circulated through the jacket, and the tip speed of the blades was reduced to about 13.8 meters/second. Each batch remained in the mixer for approximately 90 seconds during the cooling step until the temperature of the batch dropped below 60° C. to reach a preselected temperature at which time the batch was discharged.

The packing densities of the resulting material ranged from 0.88 to 0.95 grams/cc, which is an increase in packing density over material processed in a conventional blender, such as a Welex mixer.

EXAMPLE 3

TABLE II

| SAMPLE | S.G. | WELEX → 120° C. Tray Cool P.D. | WELEX → 140° C. Tray Cool P.D. | GELIMAT → 140° C. Ribbon Mix Cool | | GELIMAT → 140° C. Gelimat Cool | | GELIMAT → 160° C. Gelimat Cool | |
|---|---|---|---|---|---|---|---|---|---|
| | | | | P.D. | % increase | P.D. | % increase | P.D. | % increase |
| BASE | 1.379 | 0.625 | — | 0.685 | 9.6 | 0.710 | 13.6 | 0.735 | 17.6 |
| BASE & LOW FILLER | 1.417 | 0.649 | — | 0.695 | 7.1 | 0.745 | 14.8 | 0.833 | 28.3 |
| BASE & HIGH FILLER | 1.471 | 0.704 | — | 0.775 | 10.1 | 0.820 | 16.5 | 0.877 | 24.6 |
| BASE & LOW MODIFIER | 1.348 | 0.625 | — | 0.650 | 4.0 | 0.680 | 8.8 | 0.769 | 23.0 |
| BASE & HIGH MODIFIER | 1.310 | 0.595 | — | 0.615 | 3.4 | 0.695 | 16.8 | 0.794 | 33.4 |
| BASE & LOW $TiO_2$ | 1.435 | 0.658 | — | 0.680 | 2.3 | 0.750 | 14.0 | 0.862 | 31.0 |
| BASE & HIGH $TiO_2$ | 1.507 | 0.725 | 0.725 | 0.745 | 2.8 | 0.785 | 8.3 | 0.926 | 27.7 |

A sample of a rigid PVC pipe compound was prepared according to the process of Example 2 and compared with a similar sample produced in a Henschel mixer. Both samples were subsequently extruded in a twin screw extruder to form a 3 inch pressure pipe. The powder density of the compound produced in the Henschel mixer was 0.59 gms/cc compared with 0.66 gms/cc produced in the Gelimat. The increase in production rate through the extruder was 12.8% which was at least partially associated with the higher packing density of the material. There was also an improvement in the impact and tensile strength of the pipe.

EXAMPLE 4

A linear low-density polyethylene powder having a melt flow index of 5 was processed in the same manner as Example 2. At the end of the mixing and heating step, the temperature of the batch was in the range of 108° to 110° C., and it was found that after cooling in the mixer at the lower tip speed, the packing density increased from 0.44 to 0.58 grams/cc, an increase of up to 32%.

Further tests were carried out at a range of blade tip speeds for the mixing and heating step, the range included 23, 30, 31.3, 33.6 and 38 meters/second, and for the cooling step, the speed range was 13.8 and 16 meters/second.

EXAMPLE 5

In a further test 160 gms of linear low-density polyethylene powder having a melt flow index of 5, at a temperature of 55° C. was fed into a Gelimat mixer having a blade tip speed of 30 meters/second. The batch was mixed and heated to a temperature of 110° C. in 22 seconds. The cooling cycle took place in the same mixer at a blade tip speed of 13.8 meters per second and cooling water circulating in the mixer jacket. The batch was discharged after 27 seconds. The packing density of the processed batch was 0.538 gms/cc compared with a packing density of 0.472 gms/cc prior to the process step showing an increase in packing density of 14%.

EXAMPLE 6

A 120 gram sample of a molding grade of a low-density polyethylene powder having a melt flow index of 5, was fed to a Gelimat mixer having a blade tip speed of 31.3 meters/second. The batch was heated to 110° C. in approximately 15 seconds, and then cooled in the same manner as Example 4. The packing density of the processed batch was 0.532 gms/cc as compared to 0.424 gms/cc of the untreated powder. Thus an increase in packing density of 26% was obtained.

EXAMPLE 7

Further tests were done on the base composition defined in Table I by the addition of increased weights of additives. 20% of a filler, Omylite 95T, was added and processed in a Gelimat with a discharge temperature of 160° C. In one case the sample was cooled in a ribbon blender and in a second case in a Gelimat. Both tests produced a packing density of 0.909 gms/cc.

The same tests were run on the base composition with 40% by weight of an impact modifier Blendex 311 to produce a packing density of 0.532 gms/cc on the ribbon blender cool and 0.695 on the Gelimat cool. With 20% by weight of titanium dioxide Titanox 2101 the ribbon blender cool gave a packing density of 0.926 gms/cc and the Gelimat cool gave a packing density of 0.971 gms/cc.

The embodiments of the invention in which an exclusive property or privilege is claimed are defined as follows:

1. In a process for the manufacture of a particulate polymeric resin blend suitable for forming plastic articles in which a particulate composition comprising a thermoplastic polymeric resin is mixed and thermokinetically heated in a high intensity mixer having a plurality of blades attached to arms rotating with a blade tip speed of at least about 25 meters per second to effect blending of the composition and heating thereof to an elevated temperature below commencement of agglomeration of the particulate composition, and in which the blended and heated particulate composition is cooled in a mixer to a temperature at which the particulate composition can be stored without agglomeration, the improvement wherein the blend and heated particulate composition is cooled in a high intensity mixer with blades attached to arms rotating in said mixer, said arms being rotated at a blade tip speed of not more than 16 meters per second whereby the particulate cooled polymeric resin blend has a high packing density.

2. A process according to claim 1 wherein said particulate resin blend comprises at least one additive selected from the group consisting of processing aids, lubricants, stabilizers, antioxidants, impact modifiers, fillers and pigments.

3. A process according to claim 1 wherein the blade tip speed is in the range of about 25 to 45 meters/second for the mixing and heating step.

4. A process according to claim 1 wherein the mixing and heating step is less than about 20 seconds.

5. A process according to claim 1 wherein the cooling step is less than about 40 seconds.

6. A process according to claim 1 wherein the mixing and heating step and cooling step occur in the same high intensity mixer.

7. A powder blend comprising rigid polyvinyl chloride made by the process of claim 1.

8. A process according to claim 1 wherein said resin comprises polyvinyl chloride.

9. A process according to claim 8 wherein the temperature to which said batch is mixed and heated is below 200 C. and the temperature to which said batch is cooled is below about 60 C.

10. A process according to claim 8 wherein said particulate resin blend comprises at least one additive selected from the group consisting of processing acids, lubricants, stabilizers, antioxidants, impact modifiers, fillers and pigments.

* * * * *